United States Patent [19]

Hayashi

[11] 4,193,099
[45] Mar. 11, 1980

[54] DEVICE FOR REPRODUCING THE RECORDED CONTENT OF A MAGNETIC CARD

[75] Inventor: Hideaki Hayashi, Tokyo, Japan

[73] Assignee: Tokyo Magnetic Printing Company Ltd., Tokyo, Japan

[21] Appl. No.: 784,645

[22] Filed: Apr. 4, 1977

[30] Foreign Application Priority Data

Apr. 14, 1976 [JP] Japan ................. 51/41994
May 4, 1976 [JP] Japan ................. 51/49898
Jun. 19, 1976 [JP] Japan ................. 51/72570

[51] Int. Cl.² ............................................. G11B 5/86
[52] U.S. Cl. ........................................ 360/17; 360/2
[58] Field of Search ............................. 360/2, 15-17

[56] References Cited

U.S. PATENT DOCUMENTS

| | | | |
|---|---|---|---|
| 3,037,090 | 5/1962 | Bouzemburg | 360/17 |
| 3,277,244 | 10/1966 | Frost | 360/17 |
| 3,573,390 | 4/1971 | Frost et al. | 360/17 |
| 3,693,182 | 9/1972 | Smith | 360/2 |
| 3,872,502 | 3/1975 | Wild | 360/2 |

Primary Examiner—John H. Wolff
Attorney, Agent, or Firm—Frailey & Ratner

[57] ABSTRACT

The recorded content of a magnetic card is transferred directly to a magnetic tape simply by bringing the magnetic card into contact with the magnetic tape and applying a magnetic field to the contacting area with the aid of a copy magnet or a magnetic printing head energized by D. C. current or A. C. current, on the condition that the coercive force of magnetic material on the card is larger than that on the tape, and a reproducing head mounted along the path of the tape reproduces the transferred content. Thus, the recorded content of a magnetic card can be reproduced many times just by engaging the card in the device once.

4 Claims, 13 Drawing Figures

DEVICE FOR REPRODUCING THE RECORDED CONTENT OF A MAGNETIC CARD

BACKGROUND OF THE INVENTION

This invention relates to a reproducing device for a magnetic card, and particularly relates to a reproducing device suitable for repeatedly reproducing the content of a magnetic card.

Magnetic cards consist of a magnetic coating on a base sheet of plastic or paper, on which audio and/or other data are recorded. Some of the numerous applications for such cards are language training, educational devices for infants, cash dispensers and so forth. When the magnetic card is used in the fields of language training, infant education and so on, the card has the advantages that figures and drawings can be printed on it's surface, random access to the recorded information is possible, and the reproduction of the card can be repeated many times. However, a prior card reproducing device has the disadvantages that we cannot watch the printed drawing on the card during the reproduction operation since the card is moving, and we must re-insert the card into the device when we want to listen to the card's contents a second time.

This is especially disadvantageous when magnetic cards are applied to language education where repeated listening is an important factor.

In order to solve the above disadvantage, the U.S. Pat. No. 3,821,519 has proposed a card return mechanism, which returns a magnetically striped information card to an initial position for replaying a word or group of words. However, said U.S. patent has the disadvantage that the mechanism is very complicated and costly.

SUMMARY OF THE INVENTION

It is an object, therefore, of the present invention to overcome the disadvantages and limitations of the prior art by providing a new and improved magentic card player.

The above and other objects are attained by a reproducing device for a magnetic card in which the magnetically recorded information on a card is transferred to a magnetic drum or an endless magnetic tape with the aid of a copy magnet or a magnetic printing head, and the information recorded on the magnetic drum or the magnetic tape can be replayed many times.

BRIEF DESCRIPTION OF THE DRAWINGS

The foregoing and other objects, features, and attendant advantages of the invention will be appreciated as the same become better understood by means of the following description and accompanying drawings wherein.

THE DESCRIPTION OF THE PREFERRED EMBODIMENTS

Figure 1:
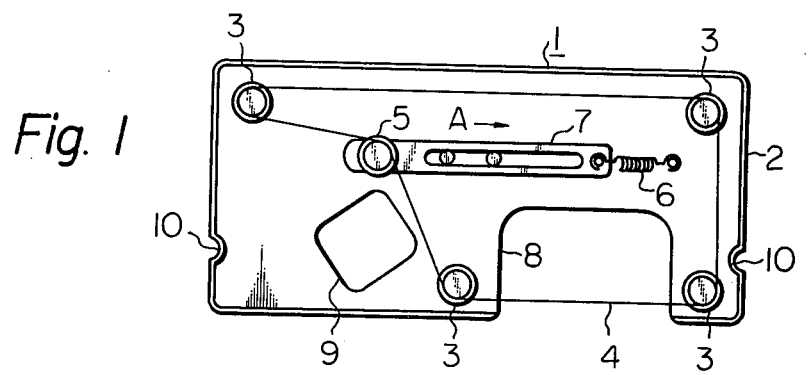
FIG. 1 shows the structure of the embodiment of the endless magnetic tape pack according to the invention.

FIG. 1 shows the endless magnetic tape pack as the pack-type magnetic recording medium according to the invention. In this figure, the tape guides 3 are rotatably placed inside the pack case 2 which is made of plastic, and the magnetic tape 4 runs around the tape guides 3. One extreme end of the magnetic tape is so connected to the other extreme end to form of endless tape in which the magnetic layer faces outwards, and the height of the magnetic tape can be adjusted by the aforementioned tape guides 3. In addition, the magnetic tape 4 comes into contact with the tension guide 5 to adjust the tension of the tape, and the tension guide 5 is rotatably attached to the slide plate 7 which is pulled inwards (marked by the arrow A in the figure) by the tension spring 6 and is slidably mounted on the pack case 2. The aforementioned pack case 2 has a cutaway 8 so that a part of the magnetic tape 4 is exposed to the outside and the magnetic printing head and erasing head mentioned later can be located at the exposed part of the magnetic tape 4, and also has the opening 9 so that the reproducing head mentioned later can be located on the outer periphery of the magnetic tape 4. Furthermore, the pack positioning grooves 10 are formed on the outer rim of the pack case 2 in order to set the mounting position of the magnetic tape pack 1.

Figure 2:
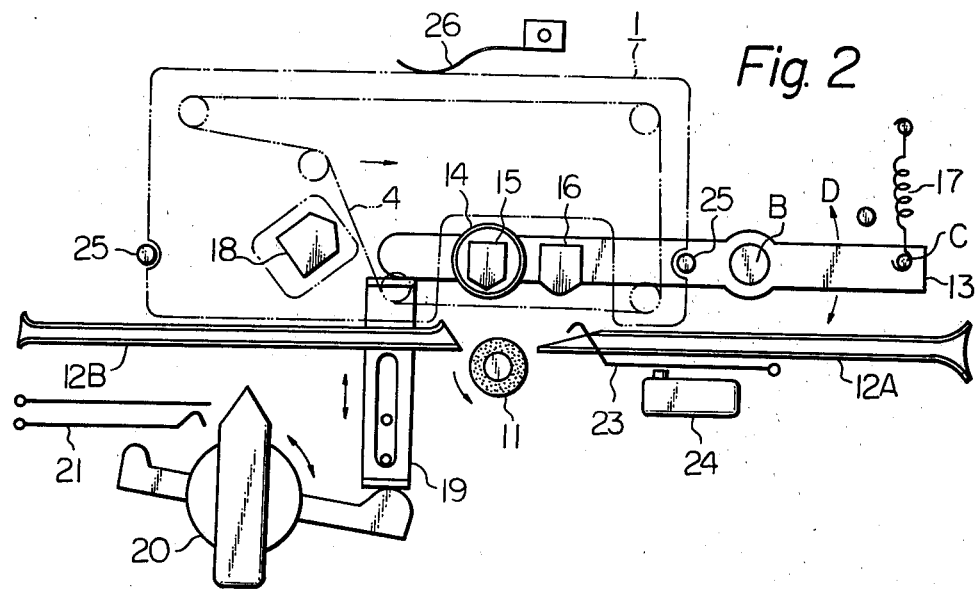
FIG. 2 shows the reproducing device according to the present invention wherein the tape pack is inserted.
Figure 3:
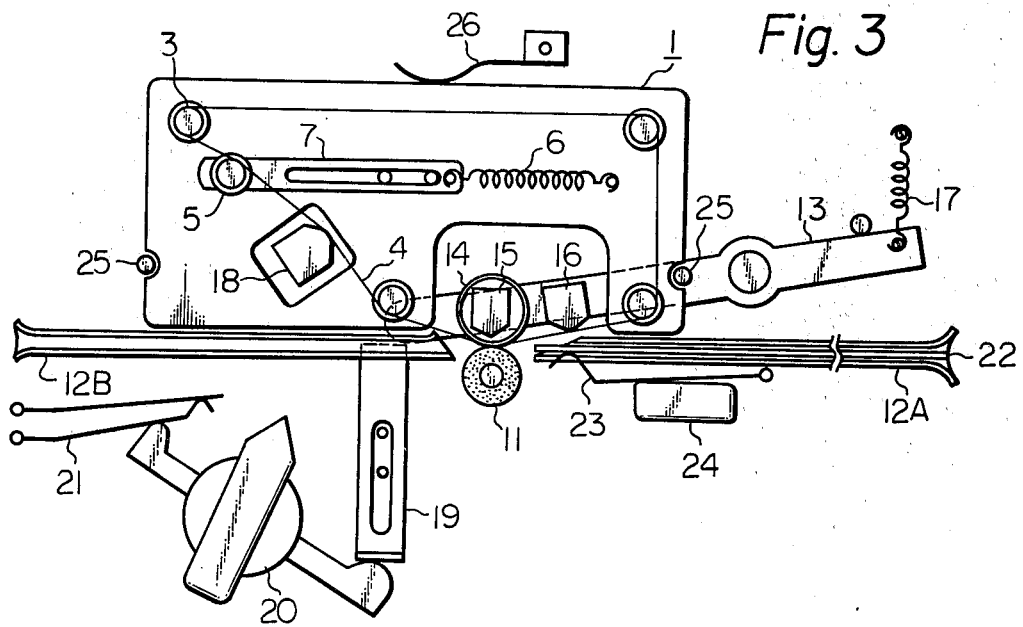
FIG. 3 shows the reproducing device wherein the device is in operation.

FIGS. 2 and 3 show the mechanical arrangement of the reproducing device of the example. In these figures, the card guides 12A and 12B are placed on either side of the capstan roller 11 which is driven at constant speed by the motor mentioned later. The swing lever 13 is supported at the point B so that it can swing around the supporting point B, and the pinch-roller 14 is rotatably attached to the lever 13 facing the aforementioned capstan roller 11. The magnetic printing head 15 is installed inside the pinch-roller or the pressure roller 14, and the erasing-head 16 is set next to the copy magnet. The aforementioned swing lever 13 is pulled at the end C in the direction of the arrow D by the tension spring 17. The reproducing head 18 is placed at the corresponding position to the opening 9 of the aforementioned pack case 2. The movable slide bar 19 comes into contact with the end, of the swing lever 13, and the drive lever 20 is placed at the relevant position to the other end of the slide bar 19. The power source switch 21 is mounted at the position covered by the action of the driving lever 20. Furthermore, close to the card guide 12A, the switch bar 23 is mounted so that it is activated by the insertion of the magnetic card 22. Also the switch 24 is fixed at the position covered by the action of the switch bar 23. In order to adjust the mounting position of the endless magnetic tape pack, the pack positioning bars 25 and pack pusher 26 are provided relating to the pack positioning grooves 10.

Figure 4:
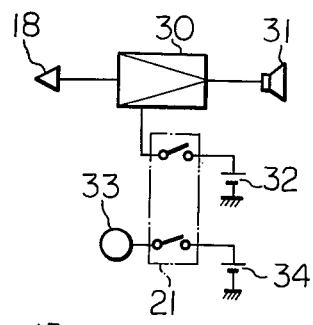
FIG. 4 shows the electrical circuits of the reproducing device according to the present invention.

FIG. 4 is the block diagram of the electric circuits relating to the reproducing device of the example. In this figure the output of the reproducing head 18 is amplified by the amplifier 30 and then applied to the speaker 31. The amplifier 30 is connected to the power source 32 through the aforementioned power source switch 21, and the motor 33 that rotates the capstan roller 11 is also connected to the power source 34 similarly through the power source switch 21. On the other hand, the copy magnet 15 and erasing-head 16 are connected respectively to the power sources 35 and 36 through the switch 24.

In the operation of the above device, the drive lever 20 is first set at the position shown in FIG. 2. In this condition, the pinch roller 14 and erasing-head 16 are separated from the capstan roller 11, since the drive lever 20 pushes the swing lever 13 clockwise by the slide bar 19. The endless magnetic tape pack 1 can be mounted on the reproducing device from the upper side. Namely, the pack positioning grooves 10 of the magnetic tape pack 1 are set to coincide with the pack positioning bars 25, and, at the same time, the pack pusher 26 is set to clamp the magnetic tape pack 1 firmly. When the magnetic tape pack is set in the manner stated above, the driving lever 20 is to be turned to the right as shown in FIG. 3. As the result, the power source switch 21 is closed, the amplifier 30 and motor 33 are connected to the power source, and the capstan roller 11 starts to turn at the predetermined speed. Further the swing lever 13 is rotated counterclockwise by the tension spring 17 since the pressure of the driving lever 20 is released. Consequently, the pinch roller 14 is pushed into contact with the capstan roller 11, and the erasing-head 16 comes to contact with the magnetic tape 4. Then the tension applied to the magnetic tape 4 is increased, and the tension guide 5 shifts outwards, and then the reproducing-head 18 comes to contact with the magnetically coated surface of the magnetic tape 4. Thus, the device is made ready for reproduction. Next, the magnetic card 22, already recorded, is inserted along the tape guide 12-A so that the magnetically coated surface of the magnetic card contacts with that of the magnetic tape 4. Consequently, the switch bar 23 is pushed by the card 22, and the switch 24 is closed. By the above operation, an A. C. or D. C. electric current is supplied to the magnetic printing head 15 and erasing-head 16. When the card runs between the capstan roller 11 and the pinch roller 14, the magnetic content of the card 22 is transferred magnetically to the magnetic tape 4 with the aid of the magnetic printing head 15, after the former content recorded on the magnetic tape 4 is erased by the erasing-head 16. It goes without saying that a magnetic substance with high coercive force should be used for the magnetic card 22, and that with low coercive force for the magnetic tape 4, in order to make the copy possible. The content transferred to the magnetic tape 4 is reproduced by the reproducing-head 18 through the amplifier 30 and the speaker 31. In this case, the content of a whole magnetic card can be reproduced repeatedly by the arrangement that the whole length of the endless magnetic tape 4 is nearly equal to the length of the magnetic card 22.

Figure 5:
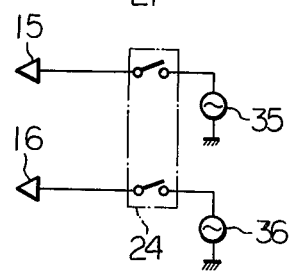
FIG. 5 shows another embodiment of the endless magnetic tape pack according to the present invention.
Figure 5:
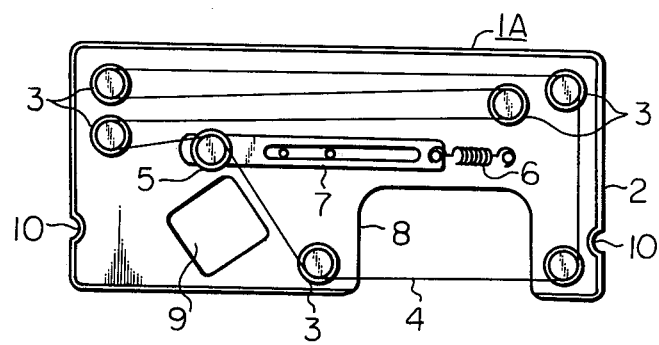

It is also possible to record the content of a plurality of cards by use of the magnetic tape pack 1A containing a longer tape mounted in zig-zag manner as shown in FIG. 5, instead of the endless magnetic tape pack 1, in which the length of the endless magnetic tape 4 is the same as that of a card.

As stated above, accordingly to the example given herein, the following are effected.

(1) When the tape is worn out, the tape can be replaced easily.

(2) The length of the tape can be changed easily by replacing the endless magnetic tape pack. For example, in the case of language exercise, a short tape corresponding to one magnetic card is preferable at first, and the short content (for example, a single word) is reproduced in repetition. When Several cards are reproduced, it is possible to copy the content of each card in sequence onto the long tape pack, and to repeatedly reproduce the content of several cards.

Figure 6:
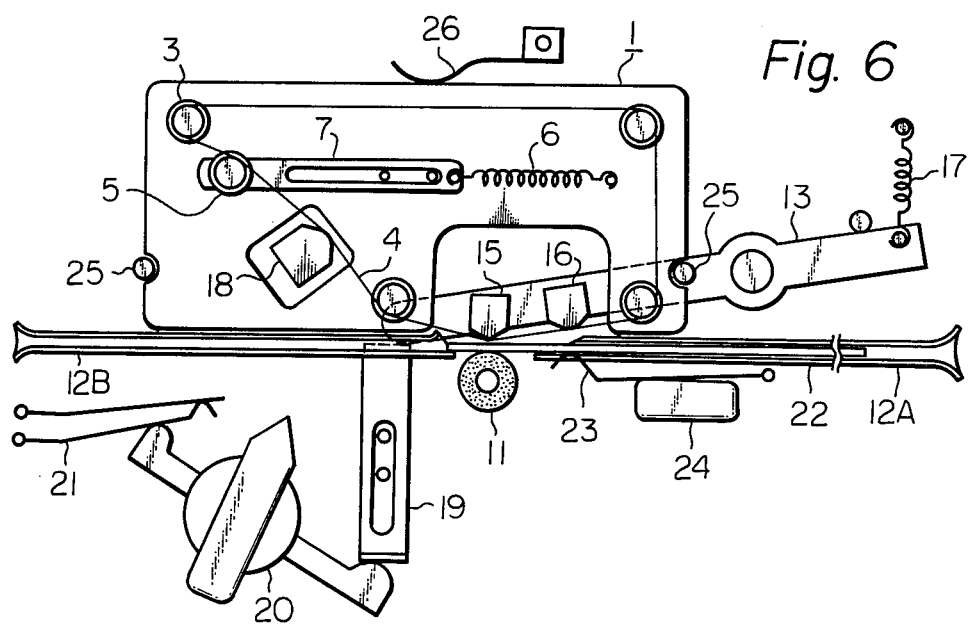
FIG. 6 shows another embodiment of the reproducing device according to the present invention.

FIG. 6 shows another example of this invention. In this example, the pinch roller or pressure roller 14 is omitted, and the magnetic printing head 15 is designed to be in direct contact with the magnetic surface of the magnetic tape 4 or the magnetic card 22. Even in this case, the magnetic card 22 and the magnetic tape 4 can run smoothly by the driving action of the capstan roller 11. In addition, when the copying of the magnetic card 22 is completed, the magnetic tape 4 alone can run smoothly by the driving action of the capstan roller 11.

According to this example, it is advantageous that the power consumed by copy-magnet is decreased by the absence of the gap between the magnetic printing head 15 and the magnetic tape 4. In addition, the structure of the device is simplified. The content of the magnetic card 22 can be reproduced directly under the condition that the endless magnetic tape pack 1 is removed. In that case, A socalled combination head that contains the erasing-head and reproducing-head in a single housing is substituted for the copy magnet 15.

In the above embodiment, the endless magnetic tape pack is at rest and the magnetic printing head 15 is movable so that the magnetic tape 4 is brought into contact with the magnetic card 22 in the arrangement mentioned above. It is however possible to obtain the same results by having the copy magnet 15 fixed and the pack movable by the driving lever 20. Further, the erasing-head can be removed. In that case, the erasing operation is performed by the copy magnet by increasing the electric current supplied to the same; and after the erasing operation the current is reduced for the normal copy operation. Contrary to the above example, in which a magnetic substance with high coercive force is used on the magnetic card 22, and that with low coercive force on the magnetic tape 4, when higher coercive substance is applied to the magnetic tape 4 than to the card 22, and further the reproducing head 18 is replaced by a recording head, it is possible to record on the magnetic tape and transfer the content of the tape to the card in the same way as the content of the card is transferred to the tape by the copy magnet 15. In this case, the card is simply run through the device once in order to transfer the content of the tape onto the same, and the mass-production of recorded cards is possible.

Figure 7:
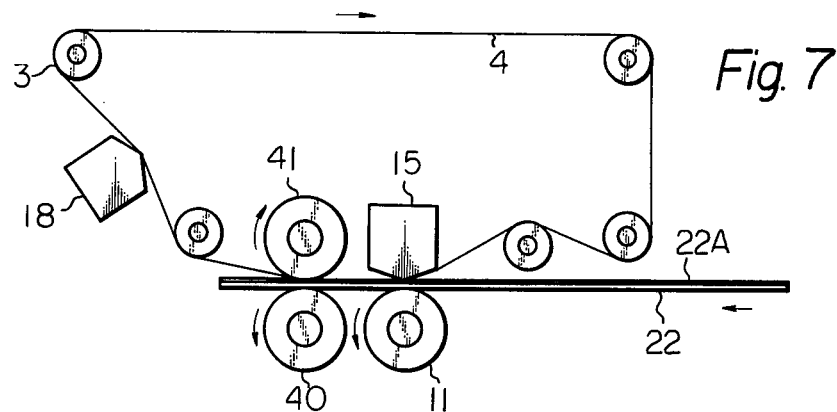
FIG. 7 shows another embodiment of the reproducing device according to the present invention.

FIG. 7 shows another embodiment of the present invention, in which an additional pair of rollers are provided for moving the tape. In FIG. 7, the reference numerals apply to the same parts as in FIGS. 1-6, and the reference numeral 40 is an additional pinch roller and 41 is an additional capstan roller. 22A is the coated surface of a magnetic card 22.

Figure 8A:
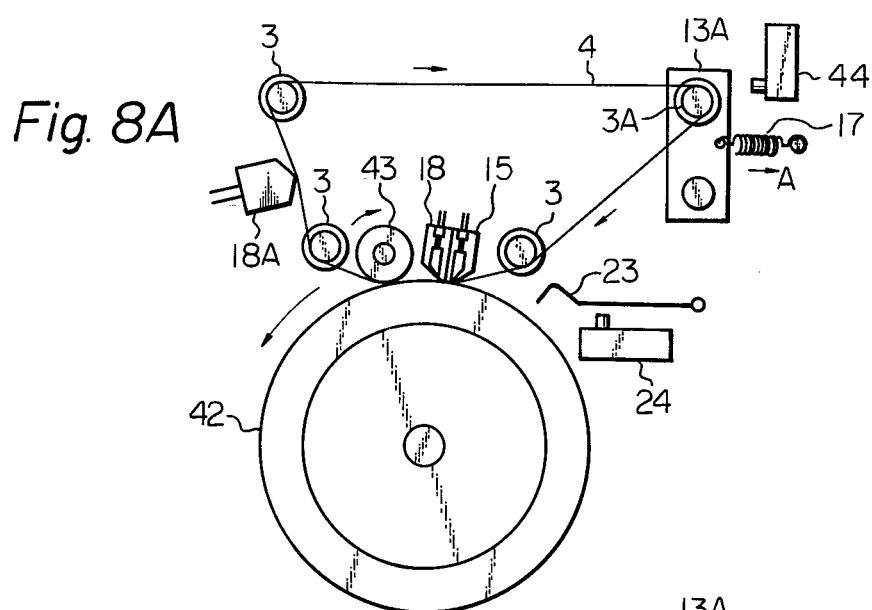
FIGS. 8A and 8B show still another embodiment of the reproducing device according to the present invention.
Figure 8B:
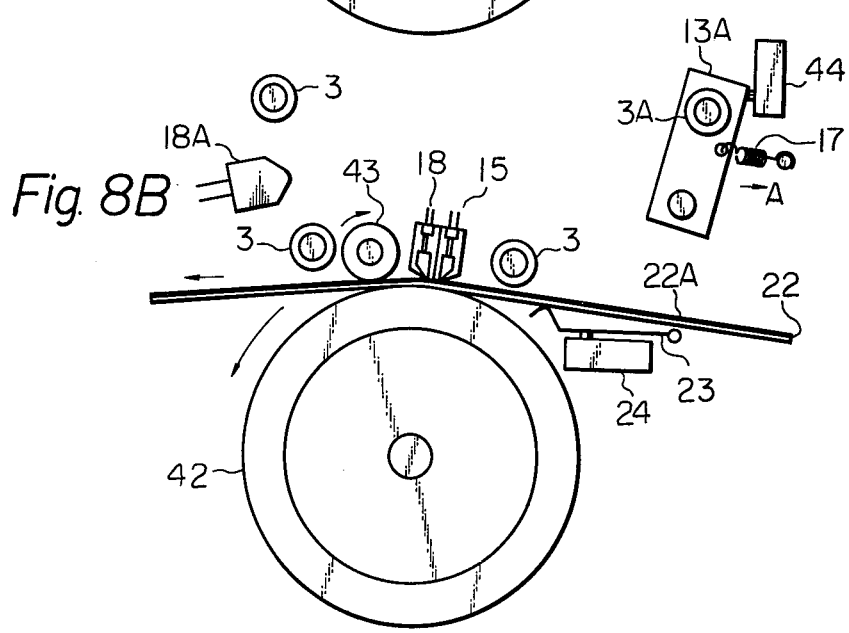

FIGS. 8A and 8B show the stucture of still another embodiment of the present invention. In those figures, a large pinch roller 42 made of rubber is provided in contact with a capstan roller 43 and a head assembly consisting of a copy magnet 15 and a card reproducing head 18. An endless magnetic tape 4 runs through the tape guides 3 and the tension guide 3A. The tape reproducing head 18A is positioned along the path of the tape 4. The large pinch roller 42 operates not only as a pinch roller for the capstan roller 43 but also as a pressure roller which pushed the tape and the card into contact with the head assembly. The tension guide 3A is mounted on the lever 13A, which is pulled in the direction A by the spring 17. The gang switch 44 is provided within the moving area of the lever 13A. Another switch 24 is provided near the switch bar 23, which is depressed when the card is inserted.

In FIG. 8A, when we try to insert a card 22 between the capstan roller 43 and the pinch roller 42, the switch bar 23 is depressed by the card and the switch 24 is closed. At this time, since the tape 4 is present, the lever 13A does not contact the switch 44, thus, the copy head 15 is energized by the power source (not shown) through the switch 24. When the coated surface 22A of a card 22 runs in contact with the tape 4, the copy magnet 15 transfers the recorded content of the card to the tape. When the card has been copied, the pressure on the switch bar 23 is released and the switch 24 is opened. If the tape 4 is run in that situation, the content of the tape 4 just transferred from the card is reproduced through the tape reproducing head 18A.

In FIG. 8B, in which a tape is removed, the copy magnet 15 is de-energized since the lever 13A depresses the gang switch 44. In this arrangement, if we run a card, we can hear the content of the card through the card reproducing head 18, thus we can hear the card directly without the transfer operation being performed.

Figure 9:
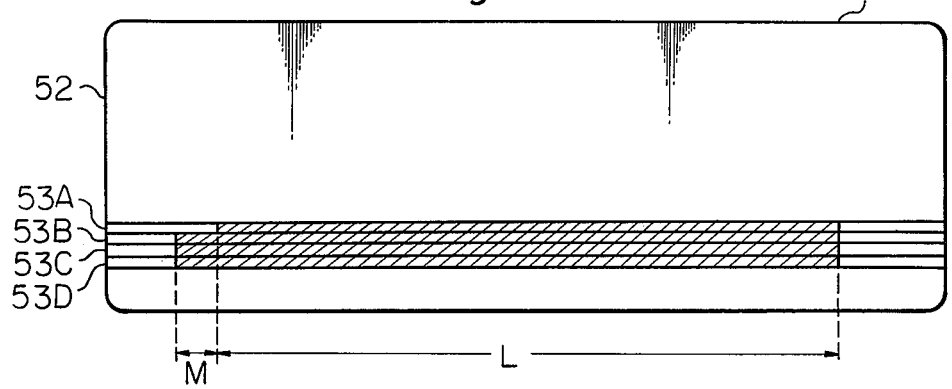
FIG. 9 shows the structure of the magnetic card for use with the present invention.

FIGS. 9 through 12 show still another embodiment of the present invention. In FIG. 9, the magnetic card 52 has a rectangular base sheet 51 made of plastic, on which a plurality of recording and/or reproducing magnetic tracks 53A, 53B, 53C and 53D are provided in the longitudianl direction of the card. Those tracks can be used to record either a continuous program from track 53A to track 53D, or independent programs. The recording length L is a little shorter than the whole length of a card.

Figure 10:
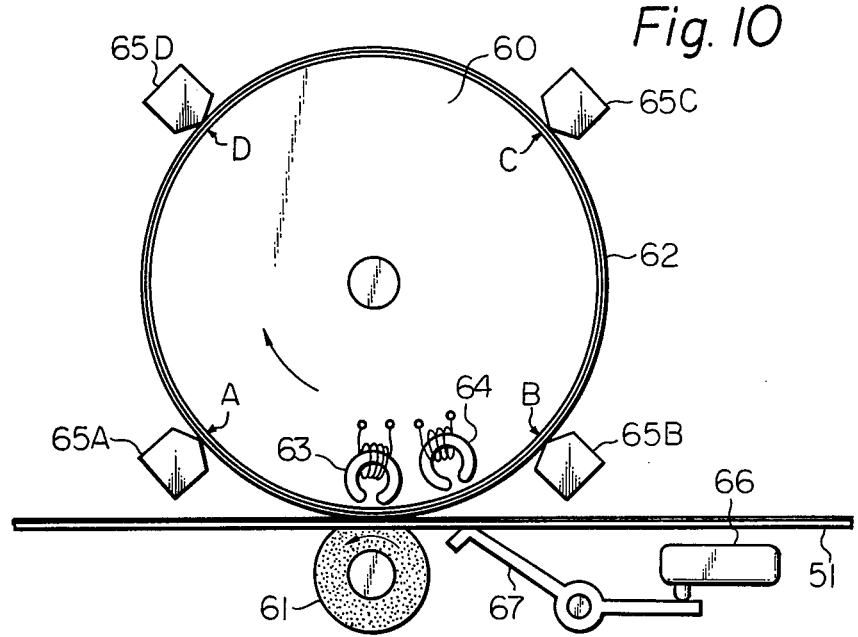
FIGS. 10 and 11 show the structure of the still another embodiment of the reproducing device according to the present invention.
Figure 11:
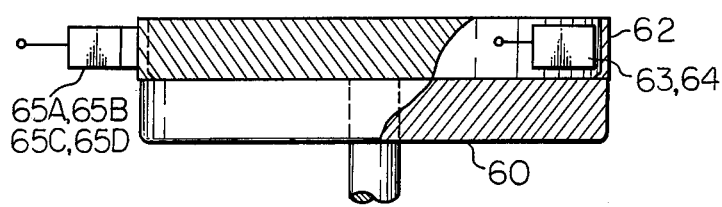
Figure 12:
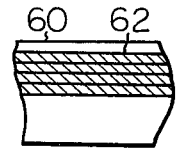
FIG. 12 shows the coated surface of the magnetic drum in FIGS. 10 and 11.

In FIGS. 10 through 12, the magnetic drum 60 is rotatably provided. The drum 60 drives the magnetic card 51 and doubles as a flywheel for stabilizing the moving speed of the card. The pressure roller 61 made of an elastic material like rubber is rotatably provided in contact with the outer surface of the magnetic drum 60. The magnetic drum 60 rotates driven by a motor (not shown) at a constant speed in the direction indicated by the arrow. The outer surface of the drum is coated with magnetic material 62. The inside of the drum 60 is hollow, and the copy magnet 63 and the erasing magnet 64 are provided on the inner surface of the drum 60. Four reproducing heads 65A, 65B, 65C and 65D are provided on the outer surface of the drum 60 at every 90° at the positions A, B, C and D coated surface of the drum 60. The height of each reproducing head is different so that each head can correspond to its particular track on the drum 60. The switch 66 for controlling the copy magnet 63 and the erasing magnet 64 is provided near the switch bar 67, which is actuated by the insertion of a card. It should be appreciated that the circumferencial length of the drum 60 is the same as the whole longitudinal length of a card, and the effective length L of each track on a card is ¾ of the circumference of the drum 60.

That is to say, the first track 53A on a card corresponds to the arc A B C D of the drum, the second track 53B to the arc B C D A, the third track 53C to the arc C D A B, and the fourth track 53D to the arc D A B C. The magnetic card 51 is coated with material of high coercive farce and the magnetic drum 60 is coated with material of low coercive force.

Of course, many modifications are possible from the embodiments explained above to those skilled in the art. For instance, an endless tape can have a plurality of recording tracks, which are reproduced in sequence. Further, said endless tape can have the portion which is not magnetically coated for a particular application.

From the foregoing, it will now be apparent that a new and improved magnetic card reproducing system has been found. It should be understood of course that the embodiments disclosed are merely illustrative and are not intended to limit the scope of the invention. Reference should be made to the appended claims, therefore, rather than the specification as indicating the scope of the invention.

Finally, the reference numerals referred to in the specification are listed below.

| | | | |
|---|---|---|---|
| 1,1A: | magnetic tape pack | 2: | pack case |
| 3: | tape guide | 4: | magnetic tape |
| 3A: | tension guide | | |
| 5: | tension guide | 6: | tension spring |
| 7: | slide plate | 8: | cutaway |
| 9: | opening | 10: | groove |
| 11: | capstan roller | 12A,12B: | card guide |
| 13: | swing lever | 14: | pinch roller |
| 13A: | lever | | |
| 15: | magnetic printing head | 16: | erasing-head |
| 17: | tension spring | 18: | reproducing-head |
| | | 18A: | tape reproducing head |
| 19: | slide bar | 20: | drive lever |
| 21: | power source switch | 22: | magnetic card |
| | | 22A: | magnetic coated surface of a card |
| 23: | switch bar | 24: | switch |
| 25: | pack positioning bar | 26: | pack pusher |
| 30: | amplifier | 31: | speaker |
| 32: | power source | 33: | motor |
| 34: | power source | 35: | power source |
| 36: | power source | 40: | pinch roller |
| 41: | capstan roller | 42: | large pinch roller |
| 43: | capstan roller | 44: | switch |
| 51: | magnetic card | 52: | basic sheet |
| 53A, 53B, 53C, 53D: | recording track | | |
| 60: | magnetic drum | 61: | pressure roller |
| 62: | magnetic material | 63: | copy magnet |
| 64: | erasing magnet | | |
| 65A, 65B, 65C, 65D: | reproducing head | | |
| 66: | switch | 67: | switch bar |

What is claimed is:

1. A reproducing device for a magnetic card for transferring data from said card to a tape loop comprising
an endless loop of magnetic recording tape mounted in a tape pack having a continuous path and being removably mounted in the device,
means for transporting a recorded magnetic card in its own flat plane adjacent said magnetic recording tape for minimizing distortion of said card, said magnetic card having a higher coercive force than said magnetic tape, said transporting means including a capstan and a pinch roller,
a magnetic printing head positioned within said magnetic recording tape loop, means for translating said pinch roller into contact with said capstan to establish an operative arrangement with said tape and card juxtaposed therebetween thereby to form a single line of tape-to-card contact transverse of said tape and adjacent said magnetic printing head, a reproducing head mounted along the path of said magnetic recording tape, and power means including first and second switch means, drive actuator means (1) for actuating said first switch means thereby to energize said capstan for rotation thereof and (2) for operating said translating means to establish said operative arrangement with said tape and card juxtaposed between said capstan and said pinch roller, a leading edge of said magnetic card contacting said second switch means thereby to energize said magnetic printing head.

2. The invention as claimed in claim 1, wherein said magnetic printing head is energized by D. C. current.

3. The invention as claimed in claim 1, wherein said magnetic printing head is energized by A. C. current.

4. The invention as claimed in claim 1, wherein said endless type magnetic recording tape has an uncoated portion.

* * * * *